United States Patent [19]
Turner

[11] 3,876,671
[45] Apr. 8, 1975

[54] COMPOUNDS DERIVED FROM THE DIESTERS OF EPOXIDIZED TETRAHYDROPHTHALIC ACID

[76] Inventor: Stanley Turner, Bldg. S-3, BMI Complex, Henderson, Nev. 89015

[22] Filed: July 28, 1972

[21] Appl. No.: 275,903

Related U.S. Application Data

[63] Continuation-in-part of Ser. No. 26,094, April 6, 1970.

[52] U.S. Cl......... 260/404.8; 260/31.6; 260/31.8 B; 260/31.8 C; 260/31.8 DA; 260/31.8 HA; 260/80.75; 260/80.81; 260/405; 260/410.9 R; 260/484 B; 260/485 L; 260/485 G; 260/30.4 EP; 260/488 R
[51] Int. Cl....... C07c 69/74; C09g 3/14; C09g 3/16
[58] Field of Search......... 260/404.8, 488 R, 468 K

[56] References Cited
UNITED STATES PATENTS

| | | | |
|---|---|---|---|
| 2,489,103 | 11/1949 | Morris et al. | 260/468 |
| 2,541,670 | 2/1951 | Segall et al. | 260/348 |
| 2,794,030 | 5/1957 | Phillips et al. | 260/348 |
| 2,806,057 | 9/1957 | Finch et al. | 260/514 |
| 2,857,303 | 10/1958 | Wilson | 154/140 |
| 2,963,490 | 12/1960 | Rowland et al. | 260/348 |
| 3,224,989 | 12/1965 | Nevin | 260/23 |

FOREIGN PATENTS OR APPLICATIONS

783,300  12/1957  United Kingdom

Primary Examiner—Alton D. Rollins
Assistant Examiner—Diana G. Rivers
Attorney, Agent, or Firm—Donald D. Mon; Joseph E. Kieninger

[57] ABSTRACT
Compositions containing a

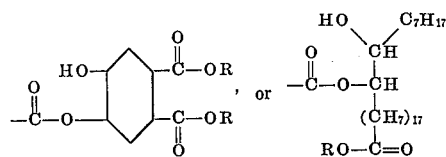

group are disclosed. As example of a composition suitable for use as plasticizer has the following structural formula:

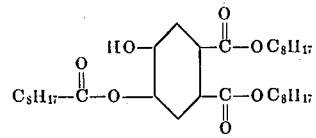

An example of an improved vinyl chloride copolymer made in accordance with this invention has the following structural formula:

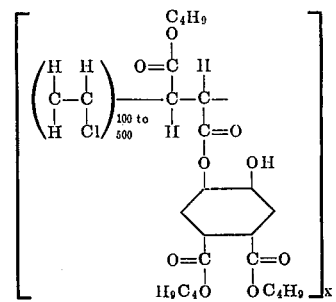

A mixture suitable for use as an improved adhesive containing a plasticizer and a terpolymer, for example, having the following structural formula:

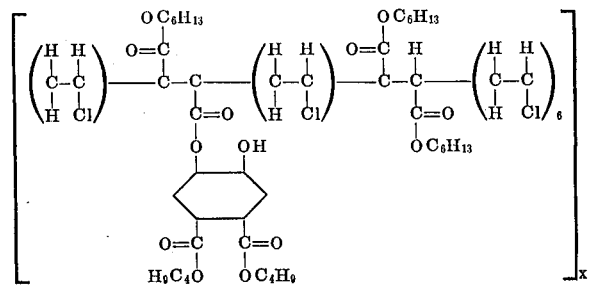

2 Claims, No Drawings

COMPOUNDS DERIVED FROM THE DIESTERS OF EPOXIDIZED TETRAHYDROPHTHALIC ACID

CROSS-REFERENCE TO OTHER PATENT APPLICATION

This is a continuation-in-part of applicant's copending patent application, Ser. No. 26,094, filed Apr. 6, 1970, entitled "Pressure Sensitive Adhesive", and now abandoned.

This invention relates to compositions which have improved properties that are derived from the inclusion of a reacted epoxy compound. Selectible ones of such properties include improved adhesion and cohesion properties for adhesives, improved functionality and greater economy for general purpose plasticizers, and improved strength, longevity and greater economy for plastic polymers. It is theorized that these improved properties are derived from the presence of a hydrogen bond derived from the epoxy radical when it is reacted with an organic acid, or is otherwise opened.

Pressure-sensitive adhesives have become of increasing interest in recent years because of the broad range of joinder applications they can fulfill. There are three primary properties which a formulator keeps in mind as he attempts to formulate an adhesive to fit a given market or a given application. These are tack, adhesion and cohesion.

All pressure-sensitive adhesives must have tack, because this property is relied upon to secure initial adhesion to a next surface. Adhesion, of course, relates to the holding power of the substance, and cohesion to the strength of the film which is relied upon to hold the film together so that the adhesive will peel off from a surface before it will part within itself. Then it does not leave a residue on the surface when peeled off.

The above are primary structural considerations and ordinarily involve tradeoffs, there being no known formulation in which all three properties are optimized at one time. In making these tradeoffs, one also encounters various secondary design considerations which are of considerable importance. Some of these are cold-flow, creep, low temperature resistance, specific adhesion to various types of untreated backings, and better shelf life (resistance to aging processes). These, while secondary, still are quite important. An adhesive which will cold-flow will extrude from the side of a roll, cement it together as a monolithic mass, and make it useless for its intended purpose. An adhesive which will creep will hold a picture to the wall, but will gradually slide down the wall with the picture. An adhesive without low temperature resistance will hold a picture on the wall very well until the weather turns cold, when it will fall off the wall with the picture. An adhesive which does not age well becomes unsaleable too soon on the shelf, and on the wall permits the migration of plasticizer which will stain both the backing and the wall. Obviously, these secondary considerations are of prime economic importance, and the adhesive of the this invention is the first known to its inventor which optimizes all of them, while still providing an optimum mix of the primary properties of tack, adhesion and cohesion.

Furthermore, the adhesive of this invention is made of relatively inexpensive materials, and is, therefore, economically feasible. It can be applied to a backing strip with the use of commercially practical machinery, and the resulting product is stable, useful and possesses properties greatly improved over those of the prior art.

Because the hydrogen bonding feature is temperature-sensitive, some embodiments of this formulation may flow at high temperatures and remain permanently fixed to a surface even after the adhesive is cooled. Therefore, some of these formulations will remain pressure-sensitive only if they are not heated above some critical temperature (usually about 130° F.) while in contact with a surface.

As to the processing of the adhesive material, an intermediate terpolymer is produced which is readily handled as a free-flowing powder or granulation. The adhesive is formed from the reaction of this intermediate with an epoxy compound, the resulting adducted terpolymer remaining fluid and subject to easy handling on practical machinery for a suitable period of time.

The pressure-sensitive adhesive of this invention includes an adducted terpolymer based upon vinyl chloride and is produced by preparing an intermediate terpolymer that includes in its structure a diester and a monoester, and adducting an epoxy compound to the carboxyl radical of the monoester, and combining this adducted terpolymer with more of the said epoxy compound, the epoxy compound having the property of a plasticizer of said adducted terpolymer, as well as that of a reactant to form said adducted terpolymer.

For inclusion in a polymer chain, such as a comonomer, the epoxy compound will be reacted, such as by adduction, to an unsaturated organic acid. The unsaturated acid may be monobasic or dibasic, and one carboxyl radical of the dibasic acid can be reacted with an alcohol and the other reacted with the epoxy compound, or the comonomer may be difunctional, instead of monofunctional, by reacting two molecules of the epoxy compound with a dibasic acid, thereby doubling the number of hydrogen bonds. Surprisingly inexpensive, long-lived, stronger copolymers can be obtained by this means.

The invention will be fully understood from the following detailed description, drawings appearing to be unnecessary to the disclosure of the same.

APPLICATION OF THIS INVENTION TO PRESSURE-SENSITIVE ADHESIVES

This invention as it applies to adhesives will be understood from the following detailed description of one useful adhesive, which is pressure-sensitive as to surfaces with which it has not been in contact as temperatures in excess of about 130° F., and it will be disclosed by means of the method by which it is made, and with reference to an exemplary formulation, together with suggested alternative components.

FORMATION OF THE INTERMEDIATE TERPOLYMER

The term "terpolymer" is used herein to connote a polymerized molecule which is derived from three different constituents. In every case, vinyl chloride will be one, and there will be two other different ones, even though one of them may appear in the basic unit more than once. For example, the intermediate terpolymer of this invention is derived from vinyl chloride, a diester and a monoester. There may, of course, be more constituents, and examples are later given of these. Therefore, the term "terpolymer" is not restricted to only three constituents, but means three or more. Preferably, the diester will be in the proportion of about 2:1 relative to the monoester. The presently preferred embodiment of this invention utilizes by weight approximately 60 percent of vinyl chloride, 29 percent diisohexylmaleate and 11 percent monoisohexylmaleate. The diisohexylmaleate is the diester of maleic acid, and the monoisohexylmaleate is the monoester (acid ester) of maleic acid.

The term "monoester" is used herein to mean a mono-substituted acid ester of a dibasic acid, leaving, of course, one carboxyl radical for later adducting.

The alkyl radicals of these esters are preferably derived from commercial oxo alcohols which contain a mixture of straight and branched chain alcohols containing between 1 and 18 carbons. The presently preferred alcohol is isohexyl alcohol as the source of the alkyl radical. The oxo alcohols are frequently referred to herein as highly branched. The term "highly branched" connotes the plurality of molecular arrangements of the various alcohols of the same general chemical formula, and it has been found that utilization of alkyl radicals, which are highly branched rather than straight chain, will result in a more effective adhesive. At any rate, commercial oxo alcohols appear to be the presently preferred, and a very suitable source for, alkyl radicals in this invention.

The intermediate terpolymer is best prepared by the use of normal suspension polymerization techniques. These are customarily carried out in a glass-lined pressure reactor fitted with a turbine agitator, baffles, and charge ports. The following charge may readily be added to the formulation, being in parts by weight: 4500 de-ionized water; 2.0 medium molecular weight polyvinyl alcohol; 2.0 low molecular weight polyvinyl alcohol; 420 diisohexyl maleate; 172 monoisohexylmaleate; 900 (plus 90 excess) vinyl chloride; and 3.0 azodiisobutyronitrile (a free radical polymerization catalyst). The de-ionized water and a stabilizing colloid are charged into the reactor. The catalyst is dissolved in the esters and charged into the reactor. The reactor is then purged of all oxygen, and the vinyl chloride is pumped in under pressure. The agitator is started, and the reactor is brought to the required temperature for the catalyst used. The combined reactants constitute 25 to 40% of the total charge. The reaction requires about 16-20 hours. The system pressure is observed, and when it drops to about 35-40 psi, the mass is transferred to a wash tank where the granular polymer is washed and stripped of unreacted vinyl chloride. The polymer is then filtered and dried and is in the condition of a fine granule. This is the intermediate terpolymer which is later to be reacted to form the adhesive.

There are many colloids which have been used for suspension polymerization. It has been found that the polyvinyl alcohols, partially hydrolized grades in low and medium viscosity ranges, are good stabilizers. Polyacrylic acid will also function well, as will the interpolymer of vinyl methyl ether and maleic anhydride low molecular weight type.

The catalysts used are the typical free radical types used in most vinyl polymerizations. Lauryl peroxide and azodiisobutyronitrile have been found to be effective in the range of between 0.05 to 0.2%.

PREPARATION OF THE EPOXY COMPOUND

The preferred epoxy compound is made by oxidizing the remaining double bond of a suitable diester, of tetrahydrophthalic anhydride, yielding a 3—4 epoxide. The alkyl chain is from 4-18 carbons, straight or branched, as before, preferably being made from 8-10 carbon commercial oxo alcohols having a mixture of normal and branched isomers. An important requirement of the epoxy compound is that it must be a primary plasticizer for the terpolymer when made into a branch terpolymer with the same epoxy compound adducted to it.

As later will be evident, the epoxy compound is used in the ultimate formulation in such an amount that there are 2 to 3 times as many epoxy groups as there will be carboxyl groups to react with. It has been found that the superior products of this adhesive are only developed when this epoxy compound, which must be a liquid, is present in the final adhesive, both as a free plasticizer and as a chemically combined branch of the terpolymer. Under these circumstances, there appears to develop an equilibrium of mutual solubilities wherein the free plasticizer has no tendency to migrate to other surfaces which the adhesive contacts, and this is an important advantage of this adhesive.

PREPARATION OF THE ESTERS

The diester monomer may have alkyl groups from 1-18 carbon, straight or branched, with the preferred range lying between 3-9 carbon, mixed isomers. Examples of suitable acids are maleic, fumaric, or itaconic. Mixed alkyl groups of the same acid may be used, and some of these possess the best average of properties for most adhesive uses. For example, 1 mol equivalent of maleic anhydride and 1 mol equivalent of isononyl alcohol may be charged into an esterification apparatus which is fitted for inert gas cover. This is heated with agitation. At approximately 80°C., heating is discontinued, and the exothermic reaction will bring the temperature up to about 130°140°C. When the temperature begins to subside, heating is resumed and n-propyl alcohol is added at a rate sufficient to give a mild reflux and remove the water of reaction.

The esterification may be carried to completion, or it may instead be stopped at a point that supplied the necessary amount of monoester for the particular adhesive formula. The products of this reaction will contain dipropylmaleate and some diisononylmaleate. The monoester present will be predominantly isononyl.

The monoesters may be prepared from maleic, fumaric, or itaconic acids. Acrylic or methacrylic may also be used to supply the carboxyl groups to the terpolymer. Of these, the maleates are by far the most useful. The monofumarates can only be conveniently prepared in conjunction with the diester. The monoitaconates and the acrylic acids polymerize well in forming the terpolymer. However, their subsequent reaction with the epoxy compound is slower than the maleates.

A suitable intermediate terpolymer may have the following weight percentages of its various formatives: 40-70% vinyl chloride, 5-55% diester, and 3-40% monoester. The presently preferred embodiment is approximately 60% vinyl chloride, 29% diester and 11% monoester.

In the adducting process, it has been found that the intermediate terpolymer may conveniently be combined with the epoxy compound to form the ultimately desired adhesive in a range between approximately 30-60% intermediate terpolymer and 40-70% epoxy compound. It has been determined that only a small portion of the epoxy compound reacts with a portion of the monoester in the terpolymer chain, thereby resulting in unreacted epoxy which serves as a plasticizer. There is also unreacted monoester in the chain.

The intermediate terpolymer may vary in intrinsic viscosity from 0.6 to 2.4. The relatively large span in molecular weight indicated by this range of useful viscosities provides for selectivity of properties in formulating specific adhesives. Intermediate terpolymers of different molecular weights may be blended prior to the adducting reaction. Molecular weight is usually controlled by the reactants used and the conditions of the reaction. However, "chain stoppers," such as the chlorinated hydrocarbons, may be used for this purpose as well. As in all ethylenic polymerizations, high temperatures and large amounts of catalysts lead to low molecular weights. In these intermediate terpolymers, there is an additional control in that large amounts of low molecular weight di- and monoesters will lower the molecular weight of the intermediate terpolymer. As applied to the completely reacted adhesive, it may be generally stated that, when the intermediate terpolymer contains relatively large amounts of low molecular weight diesters, the adhesive will have the greatest adhesion, least cohesion and be most temperature-sensitive. On the other extreme, large amounts of vinyl chloride with large alkyl, di- and monoesters yield adhesives with least adhesion, greatest cohesion, and are relatively temperature-insensitive. Properties of the adhesive can also be controlled by varying the ratio of di- to monoester. As the carboxyl content of the terpolymer increases, the tack of the adhesive will lower, and cohesion will increase.

It is important to control the degree of homogenous to heterogenous polymers formed. The monomer reactivity rate of vinyl chloride polymerizing with itself is much greater than that of vinyl chloride copolymerizing with the di- and monoesters. If all reactants are charged into the reactor at the start, the first polymer formed will contain more vinyl chloride, and be of higher molecular weight, than the final polymer formed. This is an advantage in many adhesive formulas, and greater heterogeneity can be developed by withholding part of the esters at the start and adding them gradually during the reaction. Conversely, the polymer may be made more homogenous by withholding part of the vinyl chloride and adding it gradually during the reaction.

ADDUCTING OPERATION

The adducting and coating operations are carried out substantially simultaneously. A blend of the intermediate terpolymer and the liquid epoxy compound into which there has been dispersed approximately 1% of a vinyl chloride stablizing compound, such as the commonly known barium-cadmium complex which may be purchased by that name on the open market, is fed from a blender into an extrusion machine which has been modified with a vacuum seal on the screw at the feed section to remove air from the charge. Also, the screw is run at a higher than normal speed so as to shear the material and develop frictional heat within its contents. This will first plasticize the slurry to a viscous plastic mass, and then, at the higher temperature, it will react the carboxyl and epoxy groups. As the mass nears completion of this reaction, it is necessary to shape it rather quickly to a film for coating on a substrate, because the mass will soon reach an unworkable viscosity.

The reacted material is fed from the die onto some substrate where it sets to a film useful as a pressure-sensitive adhesive.

The generalized equations for the reactions herein are summarized by the following example:

For the preparation of the intermediate terpolymer:
a. Vinyl Chloride
b. A suitable diester (for example, the diester of maleic acid) wherein the radical R is isohexyl, preferably derived from commercial oxo alcohols containing a mixture of straight and branched chain alcohols:

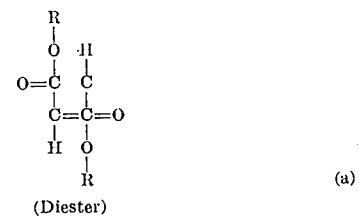

(Diester) (a)

c. A suitable monoester (acid ester) (for example, the monoester of maleic acid) wherein the radical R is as in example $a$ above:

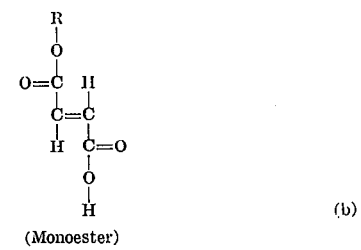

(Monoester) (b)

The prepared intermediate terpolymer has the following general structure when the following mol ratios are used: 20 vinyl chloride, 2 diester, 1 monoester:

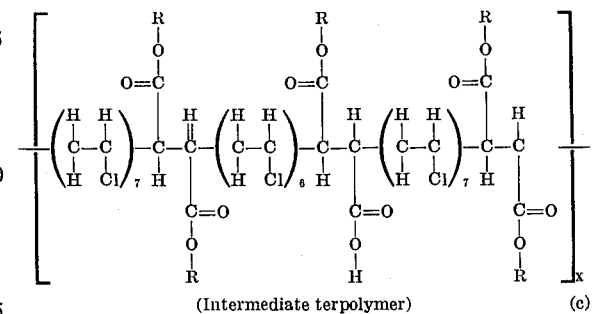

(Intermediate terpolymer) (c)

The adducting step utilizes an epoxy of which the following is an example:

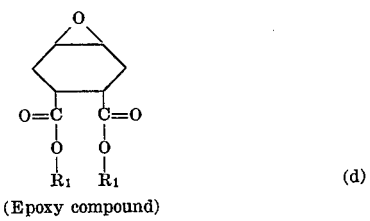

(Epoxy compound) (d)

The adducted monoester component after adduction into formula (c) is as follows:

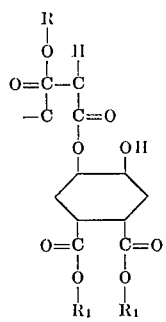

(Adducted Monoester Component) (e)

The radical $R_1$ is from 4 to 18 carbon, straight or branched, preferably made from 8 to 10 carbon commercial oxo alcohols having a mixture of normal and branched isomers.

The vinyl chloride component in formula (c) is, of course:

(Vinyl Chloride Component) (f)

The lack of cold-flow in the pressure-sensitive adhesive of the above example appears to be due to the hydrogen bonding effect of the hydroxyl-bearing molecule produced when the epoxy compound is adducted to the carboxyl group of the polymeric chain. While all hydroxyl compounds have this hydrogen bonding effect, this particular molecule, with the hydroxyl on the cyclohexane ring, possesses unusual bonding stength. It is believed the bond is to a chlorine atom in an adjacent polymer chain, as this bond would explain the effects produced in this adhesive molecule.

It has been found more practical to adduct the epoxy compound to the ethylenic acid before said acid is copolymerized with vinyl chloride and other modifying monomers. The acids used were maleic, fumaric, itaconic, acrylic and methacrylic. The dibasic acids may be used as such to form diesters with the epoxy compound, or they may be used as the monoester of alkyl groups having 1 to 18 carbons. It does not seem to make any difference in final adhesive properties whether a difunctional or monofunctional in bonding hydrogen groups is used; only the relative number of these groups to other groups in the polymer chain is important. The most common range for average pressure-sensitive adhesives is one bonding hydrogen group per 6 to 12 kg. of polymer. For special purpose adhesives, a range of 0.5 to 30 kg. of polymer per one hydrogen group has been used. As one increases the hydrogen bonding group concentration, tack is reduced, and cohesion is increased until the adhesives are no longer pressure-sensitive, but are strong, heat-bonding, permanent adhesives.

APPLICATION OF THIS INVENTION TO PERMANENT ADHESIVES

The foregoing example can produce adhesives which, if heated above a given temperature (usually about 130° F.) while in contact with a surface, will apparently flow into such intimate contact with the surface heat, even after cooling to a temperature below that given temperature, it is permanently adherent thereto. The hydrogen bonding will be increased in accordance with the above considerations if a more permanent bond is desired. By this is meant an increase in the molecular content of the addjucted terpolymer of reacted epoxy molecules which leave a hydroxyl radical free for bonding with other molecules. This is the meaning of the term "hydrogen bonding" as used herein.

In compounding for permanent bonds, the amount of hydrogen bonding molecule in the poly molecule may be increased to 50% or more. As one increases the amount of the hydrogen bonding molecule, one does not increase the temperature at which the bond starts to become permanent, but does increase the temperature required to be reached to achieve maximum bond strength, and the service temperature of the bond is increased. As bonded joints of this type tend to fail in the polymer film, rather than at the interface with the substrate, increasing the cohesive forces increases the strength of the bond. The hydrogen bonding molecule also appears to increase the bond strength at the interface.

Accordingly, increasing the proportion of the reacted epoxy molecule in the adhesive will tend to provide an adhesive which will make an increasingly permanent bond with a surface to which it is contiguous.

APPLICATION OF THIS INVENTION TO POLYMERS

When an acid with ethylenic unsaturation is adducted to an epoxy compound, as follows:

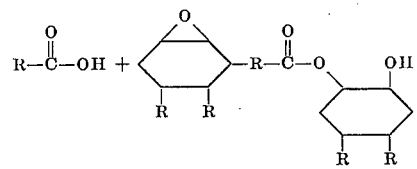

and said adducted molecule is copolymerized with vinyl chloride, the hydroxyl of the adducted molecule shows great hydrogen bonding strength when said hydroxyl is on a cyclohexane ring. This hydrogen bonding effect forms a "pseudo-cross-linked" or vulcanized effect which can be used to improve the quality of a variety of flexible and rigid plastic products. When aliphatic epoxy compounds are used instead of ring compounds, the hydrogen bonding effect is much less, but is perceptible in highly plasticized compositions.

In preparing this comonomer, the adducting proceeds smoothly at 160°–180° C., and stoichiometeric amounts are used. When maleic, fumaric or itaconic acid is used, one may adduct an epoxy compound to both carboxyls, or the acid may be used as a half ester of an alkyl group. When the acid is acrylic or methacrylic, the compound polymerizes so readily that it is necessary to use an esterification catalyst to reduce the reaction temperature, and free radical acceptors to suppress polymerization. Lewis acid type catalysts that do not promote polymerization of the double bond are suitable catalysts, i.e. p-toluene sulfonic acid. Phenothiazine and nitrobenzine will suppress polymerization. All of the adducting reactions are run in an oxygen-free atmosphere and with sufficient agitation for adequate heat transfer.

The "ring" epoxy compounds used in these preparations are the diesters of tetrahydrophthalic acid with the remaining double bond oxidized to a 3–4 epoxide. The alkyl chain can be from 1 to 18 carbon, depending on the intended end use. The preferred aliphatic epoxy compounds used are the esters of oleic acid with the double bond oxidized to an epoxide.

These comonomers can be copolymerized with vinyl chloride by simply adding them to the reactor. The amounts used depend on the intended end use of the copolymer. For flexible products, ½ to 5% based on the vinyl chloride content is the normal range. For rigid products, 50% or more may be used.

Adducts of maleic and fumaric acid tend to lower the molecular weight of the final product if used in amounts by weight in excess of about 10%. Adducts of acrylic and methacrylic acid polymerize so rapidly they are best added to the reaction slowly over the total reaction time. They tend to increase the rate of the reaction, reducing the time required to complete polymerization.

For rigid applications, such as pipe, 5 to 10% of the diepoxy adduct of itaconic acid can be used. This copolymer is easier to heat stabilize (for processing) than 100% vinyl chloride. Higher molecular weight products can be fabricated, with corresponding increases in tensile and impact strengths. The hydrogen bonding effect begins to diminish at 130° F., and at normal extrusion or molding temperature, is nil and does not interfere with processing speed. In vinyl products with normal service temperatures below 130° F., the hydrogen bonding effect will increase strength and rigidity in rigid products. In flexible products, it will increase toughness and reduce plasticizer migration.

The total percentage of bondable hydrogen to vinyl chloride is the prime factor on its modifying effect on the polymer, but there is some evidence that mono hydrogen bonding adducts are better in flexible products and di hydrogen bonding in rigid products.

A typical suspension polymerization in a 3 liter laboratory reactor is as follows:
  1400 gms de-ionized water
  1 gm polyvinyl alcohol (Elvanol R 51–05)
  1 gm polyvinyl alcohol (Elvanol R 50–42)
  .9 gm azobisisobutyronitrile in 20 ml methyl alcohol
  600 gms vinyl chloride
  12 gms acrylic acid, epoxy cyclohexane 8 carbon alkyl diester adduct The polyvinyl alcohol was first dissolved in the water, and the reactor purged of air with nitrogen. The catalyst was added as a solution in methyl alcohol and 600 gms vinyl chloride pumped in. The reaction was brought to 55°C. under agitation. At 55°, very small increments of the adduct were pumped in, requiring 3 hours to add the 12 gms. After 4½ hours, reactor pressure was 35 psig, indicating approximate 95% conversion to polymer.

When the hydrogen bonding group is copolymerized into the polymer during the initial polymerization, no further reaction is necessary; only a physical mixing of a plasticizer with the polymer. This can be conveniently done in an extrusion machine and the product coated from a sheet die.

APPLICATION OF THIS INVENTION TO PLASTICIZERS

It has been found that this hydrogen bonding effect can be effectively used in plasticizers. If a mono epoxy molecule is reacted with a monobasic, dibasic or tribasic acid, at one epoxy group for each carboxyl group, a hydrogen bonding plasticizer is formed with mono-, di-, or trifunctional bonding properties. If an adhesive polymer with minimum hydrogen bonding groups is mixed with equal parts of
  1. a non-hydrogen bonding plasticizer,
  2. a monofunctional hydrogen bonding plasticizer,
  3. a difunctional hydrogen bonding plasticizer,
  4. a trifunctional hydrogen bonding plasticizer,
the effect of these plasticizers will be very apparent. Formulas (1) will be very tacky, but do not have enough cohesive strength to function as a pressure-sensitive adhesive; (2) has good tack and sufficient cohesion to remove well; (3) has low tack and strong cohesion; (4) has very little tack, but is very cohesive and is a strong permanent adhesive if heated to effect bond. By varying the percentage of hydrogen bonding molecule in the polymer, and blending with various amounts and types of these plasticizers, an infinite number of adhesives can be compounded.

Aliphatic epoxy compounds, as well as ring compounds, have been used for both the hydrogen bonding monomer molecule and the plasticizers. Comparing adhesive mixtures, as similar as possible, the epoxy compound with the hydroxyl on the ring is always a stronger bonding molecule. The aliphatic epoxy compounds may, however, find use in low temperature applications.

An example of a suitable unsaturated compound for inclusion in a polymeric chain is as follows:

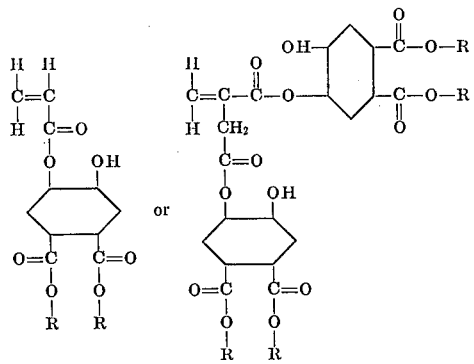

As a comonomer, it can be mono- or difunctional with its hydrogen bonding groups, as the epoxy compound can be adducted to monobasic unsaturated acids, as acrylic and methacrylic, or one carboxyl of a dibasic acid can be reacted with an alcohol and the other carboxyl reacted with the epoxy compound, or it can be difunctional by reacting two epoxy compounds with a dibasic acid.

As a free plasticizer, the same epoxy compound can be reacted (adducted) to mono-, di-, tri-, or polybasic saturated acids. Each epoxy compound adducted to an acid supplies one hydrogen bonding group. An example similar to that of the comonomer, but based upon succinic acid, a saturated acid, is as follows:

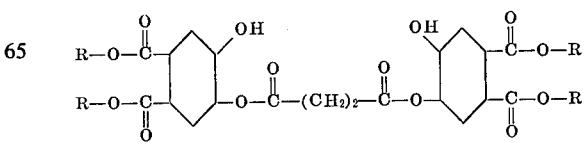

Perhaps the most conveniently-manufactured hydrogen bonding monomer is the di-epoxy ester of itaconic acid, as follows:

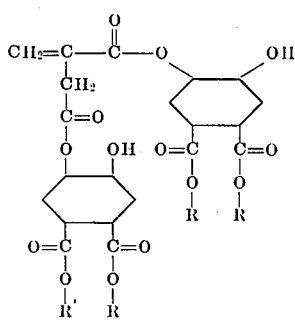

Should only a single hydrogen bond be desired, one of the carboxyl groups may be reacted by esterification with a mono alcohol, and the other with the epoxy monomer.

An example of a polymer molecular structure incorporating the monomer is as follows:

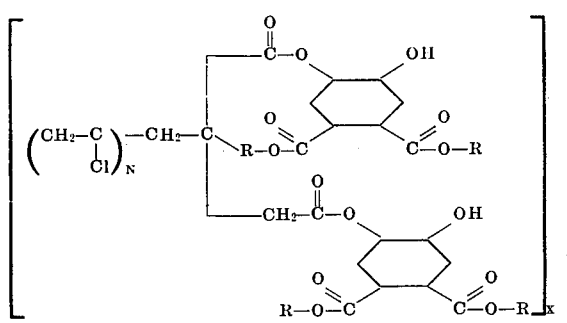

To summarize:

The hydrogen bonding effect in a molecule tends to reduce above about 130° F. Below that temperature, it is appreciable and creates a "cross-linking" or "pseudo-vulcanizing" effect, which is useful in polymers used for structural articles whose service temperatures are usually below 130° F.

As to adhesives, the material tends to flow and becomes softer when heated, and thereby can make an intimate and permanently bonding adhesive joinder when cool. An example of an application where this feature is quite useful is in hot patches for clothes, where an adhesive-coated patch will be pressed in place by application of a hot iron at a temperature above 130° F. When the patch cools, a tight joinder will exist which is quite flexible.

As to plasticizers, it is theorized that the hydrogen bonding available from a reacted epoxy causes the plasticizer to bond itself to the polyvinylchloride, and there is markedly reduced volatilization of the plasticizer.

When used as a comonomer in a polymeric chain, the hydrogen bonding available at service temperatures creates a pseudo-vulcanization, giving the material considerable physical strength.

Compositions having the following structures exhibit the hydrogen bonding effect:

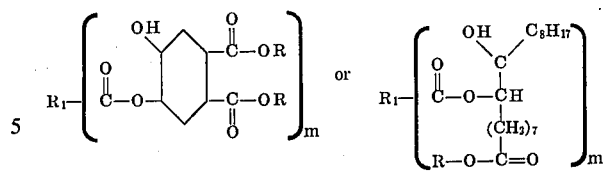

where R is an alkyl group having 1 to 18 carbon atoms, $R_1$ is an alkyl group having 1 to 18 carbon atoms.

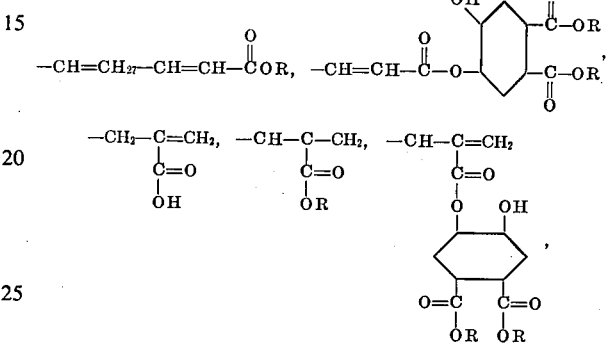

$$-(CH_2)_n-\overset{O}{\overset{\|}{C}}OH,$$

where $n = 1$ to 7, or, $$-CH_2-\underset{\underset{H}{\overset{|}{O}}}{\underset{\overset{|}{C=O}}{\overset{|}{C}}}-CH_2-\overset{O}{\overset{\|}{C}}OH.$$

$m$ is 1 to 3; when $m > 1$, $R_1$ must contain at least m carbon atoms

When $R_1$ is a saturated group, the composition is useful as a plasticizer. An example of such a compound is illustrated by the structural formula

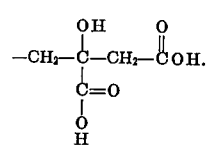

When $R_1$ is an unsaturated group, the composition is useful as a monomer. An example of such a monomer is illustrated by the structural formula

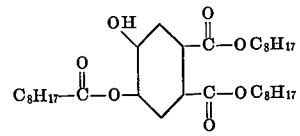

As stated earlier, these monomers can be used to form copolymers having improved properties. For example, vinyl chloride copolymers made with the monomers of this invention have greatly increased strength. An example of such a copolymer is illustrated by the structural formula

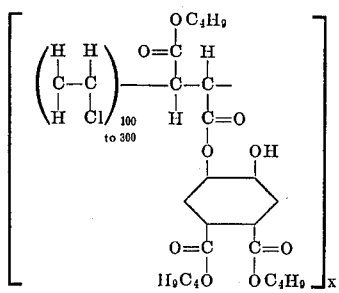

In all of the foregoing applications, materials can be made for usage as end products, or as component parts of end products, which develop physical properties such as shear strength and tensile strength equal to, or superior to, compositions commonly used for like purposes which cost much more.

I claim:

1. A compound characterized by the general formula

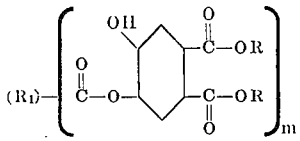

where $m$ is 1;

R is an alkyl group having 1 to 18 carbon atoms; and $R_1$ is an alkyl group having 1 to 18 carbon atoms.

2. A compound as described in claim 1 wherein $R_1$ is $C_8H_{17}$, and R is $C_8H_{17}$.

* * * * *